United States Patent
Lin et al.

(10) Patent No.: US 6,947,597 B2
(45) Date of Patent: Sep. 20, 2005

(54) SOFT PICTURE/GRAPHICS CLASSIFICATION SYSTEM AND METHOD

(75) Inventors: Ying-wei Lin, Penfield, NY (US);
Stuart A. Schweid, Pittsford, NY (US);
Jeng-nan Shiau, Webster, NY (US);
Raja Bala, Webster, NY (US); Zhigang Fan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 665 days.

(21) Appl. No.: 09/965,880

(22) Filed: Sep. 28, 2001

(65) Prior Publication Data

US 2003/0063803 A1 Apr. 3, 2003

(51) Int. Cl.[7] .................................................. G06K 9/62
(52) U.S. Cl. ....................................... 382/224; 382/156
(58) Field of Search ................................. 382/224, 156, 382/181

(56) References Cited

U.S. PATENT DOCUMENTS

| | | | | |
|---|---|---|---|---|
| 5,640,492 | A | * 6/1997 | Cortes et al. ................... | 706/20 |
| 5,767,978 | A | 6/1998 | Revankar et al. | |
| 5,778,156 | A | 7/1998 | Schweid et al. | |
| 5,917,963 | A | * 6/1999 | Miyake ....................... | 382/300 |
| 6,351,558 | B1 | * 2/2002 | Kuwata ....................... | 382/168 |
| 2001/0052971 | A1 | * 12/2001 | Tsuchiya et al. ............. | 355/77 |
| 2002/0067857 | A1 | * 6/2002 | Hartmann et al. .......... | 382/224 |

FOREIGN PATENT DOCUMENTS

| | | | | |
|---|---|---|---|---|
| JP | 11055540 A | * 2/1999 | ............. | H04N/1/60 |
| JP | 11066301 A | * 3/1999 | ............. | G06T/7/00 |

OTHER PUBLICATIONS

Berry et al. "A comparative Study of Matrix Measures for Maximum Likelihood Texture Classification." IEEE Trans. on Systems, Man and Cybernetics, vol. 21, No. 1, Jan. 1991, pp. 252–261.*

Athitsos et al. "Distinguishing Photographs and Graphics on the World Wide Web." Proc. IEEE Workshop on Content-Based Access of Image and Video Libraries, Jun. 20, 1997, pp. 10–17.*

Arrowsmith et al. "Hybrid Neural Network System for Texture Analysis." 7th Int. Conf. on Image Processing and Its Applications, vol. 1, Jul. 13, 1999, pp. 339–343.*

* cited by examiner

*Primary Examiner*—Jon Chang
(74) *Attorney, Agent, or Firm*—Fay, Sharpe, Fagan, Minnich & McKee, LLP (57) ABSTRACT

A method and system for image processing, in conjunction with classification of images between natural pictures and synthetic graphics, using SGLD texture (e.g., variance, bias, skewness, and fitness), color discreteness (e.g., R_L, R_U, and R_V normalized histograms), or edge features (e.g., pixels per detected edge, horizontal edges, and vertical edges) is provided. In another embodiment, a picture/graphics classifier using combinations of SGLD texture, color discreteness, and edge features is provided. In still another embodiment, a "soft" image classifier using combinations of two (2) or more SGLD texture, color discreteness, and edge features is provided. The "soft" classifier uses image features to classify areas of an input image in picture, graphics, or fuzzy classes.

27 Claims, 6 Drawing Sheets

SOFT PICTURE/GRAPHICS CLASSIFICATION SYSTEM AND METHOD

BACKGROUND OF THE INVENTION

The present invention relates to image processing. It finds particular application in conjunction with classification of images between natural pictures and synthetic graphics, and will be described with particular reference thereto. However, it is to be appreciated that the present invention is also amenable to other like applications.

During the past several decades, products and services such as TVs, video monitors, photography, motion pictures, copying devices, magazines, brochures, newspapers, etc. have steadily evolved from monochrome to color. With the increasing use of color products and services, there is a growing demand for "brighter" and more "colorful" colors in several applications. Due to this growing demand, display and printing of color imagery that is visually pleasing has become a very important topic. In a typical color copier application, the goal is to render the scanned document in such a way that it is most pleasing to the user.

Natural pictures differ from synthetic graphics in many aspects, both in terms of visual perception and image statistics. Synthetic graphics are featured with smooth regions separated by sharp edges. On the contrary, natural pictures are often noisier and the region boundaries are less prominent. In processing scanned images, it is sometime beneficial to distinguish images from different origins (e.g., synthetic graphics or natural pictures), however, the origin or "type" information about a scanned image is usually unavailable. The "type" information should be automatically extracted from the scanned image. This "type" information is then used in further processing of the images. High-level image classification can be achieved by analysis of low-level image attributes geared for the particular classes. Coloring schemes (e.g., gamut-mapping or filtering algorithms) are tailored for specific types of images to obtain quality reproduction. Once an image has been identified as a graphics image, further identification of image characteristics can be used to fine-tune the coloring schemes for more appealing reproductions. The most prominent characteristics of a graphics image include patches or areas of the image with uniform color and areas with uniformly changing colors. These areas of uniformly changing color are called sweeps.

Picture/graphics classifiers have been developed to differentiate between a picture image and a graphics image by analyzing low-level image statistics. For example, U.S. Pat. No. 5,767,978 to Revankar et al. discloses an adaptable image segmentation system for differentially rendering black and white and/or color images using a plurality of imaging techniques. An image is segmented according to classes of regions that may be rendered according to the same imaging techniques. Image regions may be rendered according to a three-class system (such as traditional text, graphic, and picture systems), or according to more than three (3) image classes. In addition, only two (2) image classes may be required to render high quality draft or final output images. The image characteristics that may be rendered differently from class to class may include half toning, colorization and other image attributes.

Graphics are typically generated using a limited number of colors, usually containing only a few areas of uniform colors. On the other hand, natural pictures are more noisy, containing smoothly varying colors. A picture/graphics classifier can analyze the colors to distinguish between picture and graphics images.

Graphics images contain several areas of uniform color, lines drawings, text, and have very sharp, prominent, long edges. On the other hand, natural pictures are very noisy and contain short broken edges. A picture/graphics classifier can analyze statistics based on edges to distinguish between picture and graphics images.

Classifiers that can be used to solve a certain classification problem include statistical, structural, neural networks, fuzzy logic, and machine learning classifiers. Several of these classifiers are available in public domain and commercial packages. However, no single classifier seems to be highly successful in dealing with complex real world problems. Each classifier has its own weaknesses and strengths.

The picture/graphics classification methods described above each use features of the image to make a "binary" classification decision (i.e., picture or graphics). The binary classification result is then used to "switch" between image processing functions. However, using the current set of features and the binary classification scheme, the classification accuracy, as tested on large image sets, is not perfect. Even with improved features and the binary classification scheme, it may not be possible to achieve perfect classification. In fact, there are images for which a clear classification cannot even be made by a human observer. Under such circumstances, the binary decision is often wrong, and could lead to objectionable image artifacts.

U.S. Pat. No. 5,778,156 to Schweid et al. discloses an improved method of image processing utilizing a fuzzy logic classification process. The disclosure includes a system and method to electronically image process a pixel belonging to a set of digital image data with respect to a membership of the pixel in a plurality of image classes. This process uses classification to determine a membership value for the pixel for each image class and generates an effect tag for the pixel based on the fuzzy classification determination. The pixel is image processed based on the membership vector of the pixel. The image processing may include screening and filtering. The screening process screens the pixel by generating a screen value according to a position of the pixel in the set of digital image data; generating a screen amplitude weighting value based on the values in the membership vector for the pixel; multiplying the screen value and the screen amplitude weighting value to produce a modified screen value; and adding the modified screen value to the pixel of image data. The filtering process filters the pixel by low-pass filtering the pixel; high-pass filtering the pixel; non-filtering the pixel; multiplying each filtered pixel by a gain factor based on the values in the membership vector associated with the pixel; and adding the products to produce a filtered pixel of image data.

The present invention contemplates new and improved methods for classifying images that overcome the above-referenced problems and others.

SUMMARY OF THE INVENTION

In accordance with one aspect of the present invention, a method for classification of an image is provided. The method is comprised of: a) extracting a plurality of features from an input image; and b) classifying the input image in picture or graphics classes using a combination of two or more of the extracted features.

In accordance with another aspect of the present invention, a method for evaluating the confidence level of the classification of an image is provided. The method is comprised of: a) extracting a plurality of features from an input image; b) classifying the input image in picture or graphics classes using at least one of the extracted features to; and c) determining the confidence level of the classification using a combination of two or more of the extracted features.

In accordance with another aspect of the present invention, a method for classification of an input image in natural picture or synthetic graphics classes is provided. The method is comprised of: a) extracting one or more spatial gray-level dependence texture features from the input image; b) processing each extracted feature using an algorithm associated with the feature; c) comparing the result of each feature algorithm to one or more previously selected thresholds; and d) if, according to previously determined rules, any comparison is determinative of the class of the input image, classifying the input image in either the natural picture or synthetic graphics class according to the previously determined rules, otherwise indicating the result is indeterminate.

In accordance with another aspect of the present invention, another method for classification of an input image in natural picture or synthetic graphics classes is provided. The method is comprised of: a) extracting one or more color discreteness features from the input image; b) processing each extracted feature using an algorithm associated with the feature; c) comparing the result of each feature algorithm to one or more previously selected thresholds; and d) if, according to previously determined rules, any comparison is determinative of the class of the input image, classifying the input image in either the natural picture or synthetic graphics classes according to the previously determined rules, otherwise indicating the result is indeterminate.

In accordance with another aspect of the present invention, another method for classification of an input image in a synthetic graphics class is provided. The method is comprised of: a) extracting one or more edge features from the input image; b) processing each extracted feature using an algorithm associated with the feature; c) comparing the result of each feature algorithm to one or more previously selected thresholds; and d) if, according to previously determined rules, any comparison is determinative of the class of the input image, classifying the input image in either the natural picture or synthetic graphics classes according to the previously determined rules, otherwise indicating the result is indeterminate.

In accordance with another aspect of the present invention, another method for classification of an input image in natural picture or synthetic graphics classes is provided. The method is comprised of: a) extracting a plurality of features from an input image; and b) processing two or more extracted features using a neural network to classify the input image in either natural picture or synthetic graphics classes.

In accordance with another aspect of the present invention, an image processing system for producing an output image associated with an input image based on classification of the input image is provided. The system is comprised of: a feature extractor for extracting a plurality of features from the input image; a binary classifier for classifying the input image in natural picture or synthetics graphics classes using a combination of any two or more of the extracted features; a picture processing module for processing the input image using picture image processing functions; a graphics processing module for processing the input image using graphics image processing functions; and a switch for routing the input image for image processing by the picture processing module or the graphics processing module based on the classification of the input image by the binary classifier in either natural picture and synthetic graphics classes.

In accordance with another aspect of the present invention, a method for classification of areas of an input image in picture, graphics, or fuzzy classes is provided. The method is comprised of: a) extracting a plurality of features from an input image; and b) processing two or more extracted features using a soft classifier to classify areas of the input image in either picture, graphics, or fuzzy classes.

In accordance with another aspect of the present invention, an image processing system for producing an output image associated with an input image based on classification of areas of the input image is provided. The system is comprised of: a feature extractor for extracting a plurality of features from the input image; a soft classifier for classifying areas of the input image in picture, graphics, or fuzzy classes using a combination of any two or more of the extracted features; a plurality of image processing modules for providing a plurality of image processing functions; and a blender for blending the image processing functions from the image processing modules, said blending based on the classification of areas of the input image by the soft classifier.

One advantage of the present invention is that an input image is classified as either a natural picture or synthetic graphics with less error than prior classifiers by using new features for classification.

Another advantage of the present invention is that an input image is classified as either a natural picture or synthetic graphics with less error than prior classifiers by using combinations of features for classification.

Another advantage of the present invention is that an input image is classified by a "soft" classifier using new features and combinations of features to classify areas of the image as either picture, graphics, or fuzzy classes.

Another advantage of the present invention is that the "soft" classifier is able to predict a confidence level for picture and graphics image classification.

Another advantage of the present invention is that image processing functions are blended in conjunction with picture, graphics, and fuzzy classifications of image areas by the "soft" classifier to produce a more desirable output image than prior image processing systems.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Spatial gray-level dependence (SGLD) techniques for image analysis are well known. SGLD feature extraction creates a two-dimensional histogram that measures first and second-order statistics of an image. These features are captured in SGLD matrices. This was originally proposed for texture analysis of multi-level images. Additionally, since texture features distinguish natural pictures from synthetic graphics, SGLD techniques can be applied to picture/graphics classification of images. A picture/graphics classifier can be created with algorithms that analyze the texture features captured in SGLD matrices. Using the SGLD texture features, the classifier works to determine whether a scanned image is a natural picture or synthetic graphics. Furthermore, in color images, the luminance component typically contains enough information to determine the origin of the image. Therefore, an SGLD matrix that captures the luminance component of an image and a picture/graphics classifier using the luminance component from the matrix in a classification algorithm can determine whether the image is a natural picture or synthetic graphics.

Figure 1:
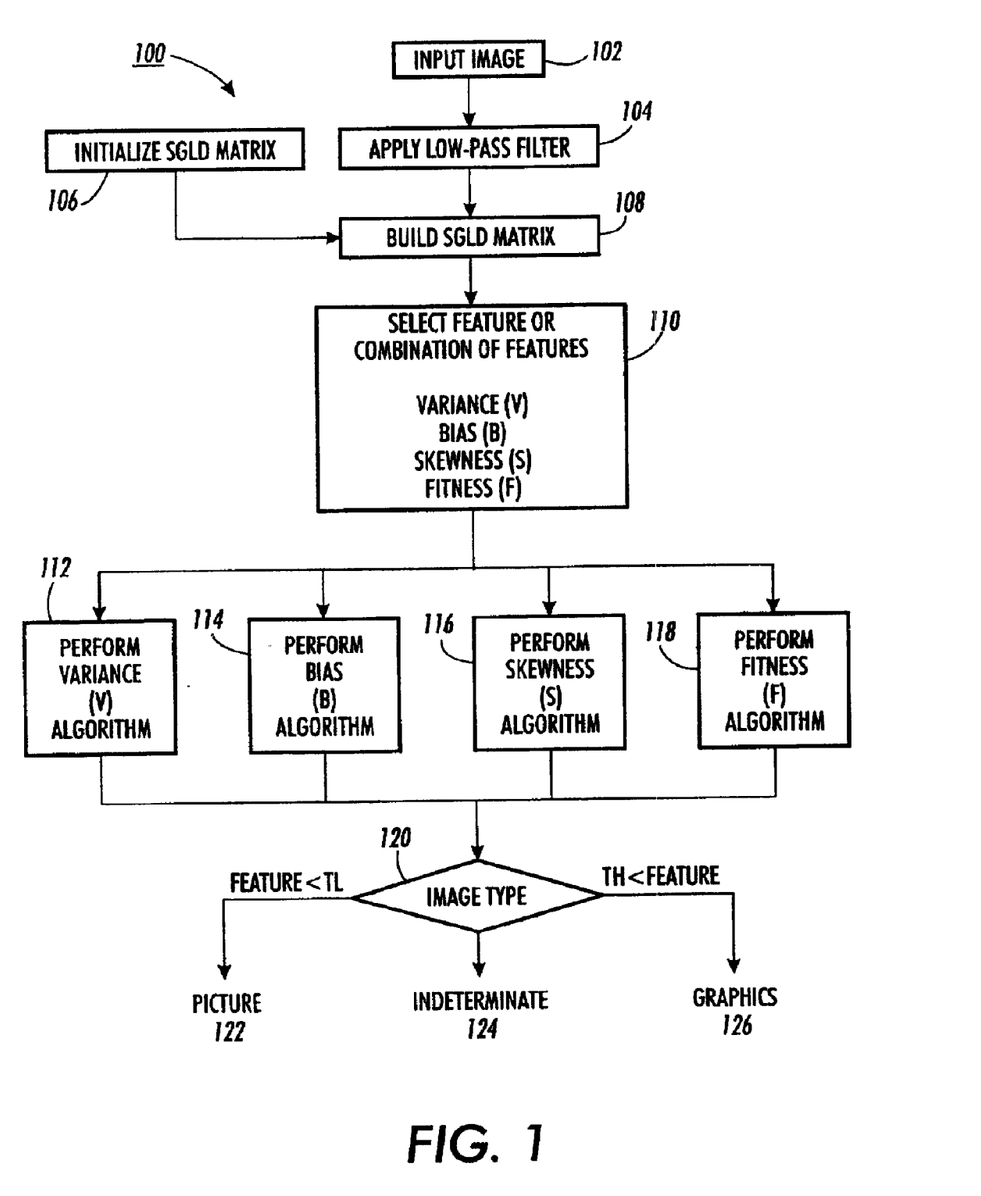
FIG. 1 is a flowchart of an image classification process using SGLD texture features in accordance with an embodiment of the present invention.

With reference to FIG. 1, a flowchart of an image classification process using SGLD texture features 100 in accordance with an embodiment of the present invention is shown. Generally, the classification process filters an input image to smooth out halftones, builds an SGLD matrix from the smoothed image, extracts texture features from the matrix, and performs an algorithm to determine whether the image is a natural picture or synthetic graphics based on one (1) or more of the texture features.

More specifically, the process 100 begins with an input image 102. The image is processed using a low-pass filter 104 (e.g., a W×W averaging filter) to smooth the luminance component and reduce any halftone noise. The SGLD matrix is basically a GL×GL two-dimensional histogram, where GL is the number of gray levels (e.g., 256). The SGLD matrix is generated by first performing an initialization (e.g., set to zero) 106. Next, the SGLD matrix is built from the smoothed image 108. The SGLD matrix is a two-dimensional histogram corresponding to certain characteristics of the pixels in the input image. For each pixel (m, n) in the smoothed image, a neighboring value is calculated using the following logic and equations:

if $|x(m, n+d)-x(m, n)|>|x(m+d, n)-x(m, n)|$ then $y(m, n)=x(m, n+d)$, otherwise $y(m, n)=x(m+d, n)$, (1), where x(m, n) is the smoothed pixel value at (m, n), (m, n+d) and (m+d, n) are vertical and horizontal neighbors, respectively, and d is a fixed integer (typically 1 or 2).

Figure 2:
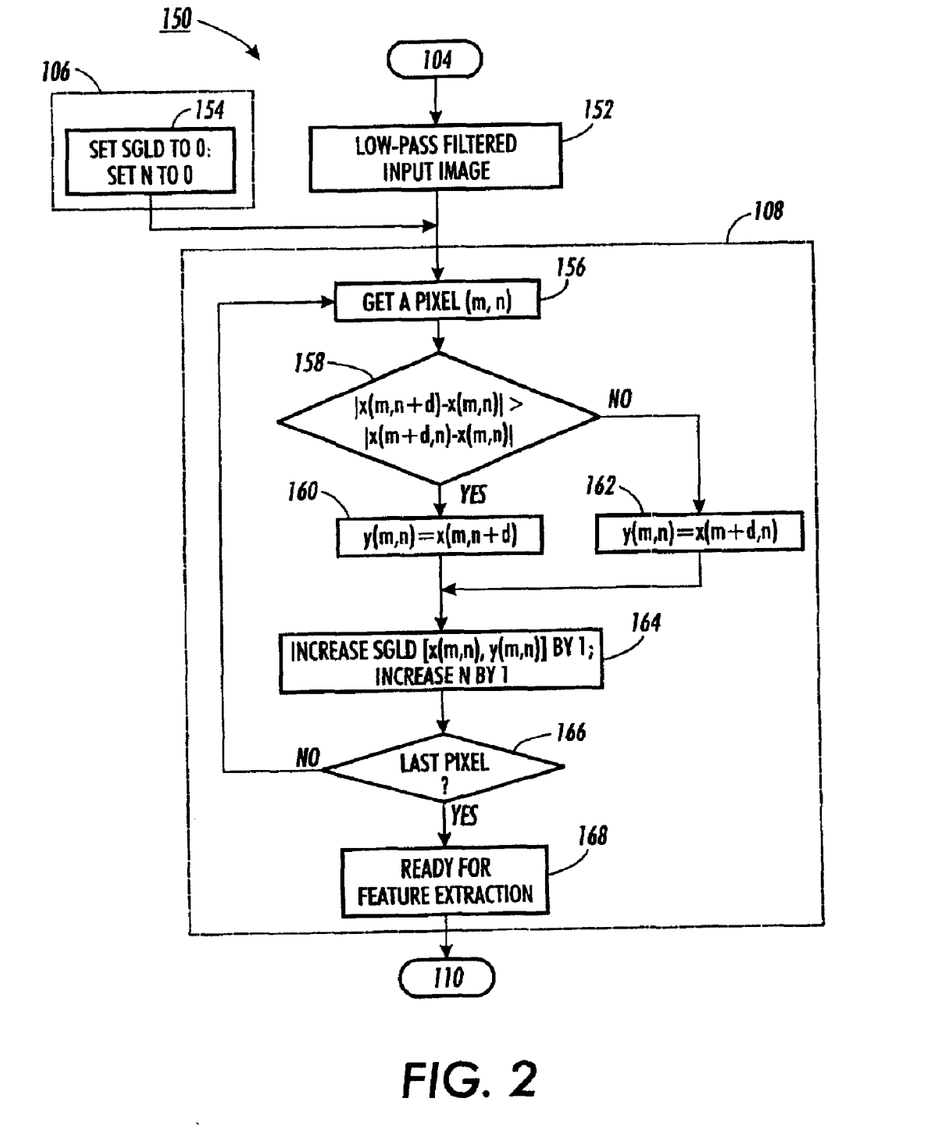
FIG. 2 is a flowchart of the SGLD matrix initialization and construction process in accordance with an embodiment of the present invention.

With reference to FIG. 2, a flowchart of an embodiment of the SGLD matrix initialization and construction process is shown. The initialization step 106 sets the SGLD matrix to zero (0) and sets a pixel counter (N) to zero (0) 154. The SGLD matrix is constructed from a low-pass filtered image 152 provided by the low-pass filter 104. Construction of the SGLD matrix begins by getting a pixel (m, n) 156 from the filtered image. A neighboring value for the pixel (m, n) is calculated using the algorithm in equation (1). If $|x(m, n+d)-x(m, n)|>|x(m+d, n)-x(m, n)|$ 158, then $y(m, n)=x(m, n+d)$ 160. Otherwise, $y(m, n)=x(m+d, n)$ 162. As is apparent, if pixel (m, n) is in a flat area where x(m, n) is equal to y(m, n), the entry [x(m, n), y(m, n)] is on the diagonal. On the other hand, if (m, n) is on an edge, the difference between x(m, n) and y(m, n) will be significant, and [x(m, n), y(m, n)] will be far away from the diagonal.

The entry [x(m, n), y(m, n)] in the SGLTD matrix is then increased by one (1) and the pixel counter (N) is increased by one (1). Next, a check is made to determine if the calculation was for the last pixel 166 of the input image. If so, SGLD matrix construction is complete and the SGLD matrix is ready for feature extraction 168. Otherwise, the next pixel is retrieved 156 from the input image.

For the matrix, the neighboring pixels in graphics images are expected to be either correlated or very different. In other words, for graphics images, SGLD matrix entries are usually either on the diagonal or far away from the diagonal. This is because most pixels are either at the flat regions or on the edges. On the other hand, pixels of natural pictures are not expected to have many abrupt changes. Accordingly, masses are expected to be concentrated at the entries that are near the diagonal for picture images. This shows the noisy nature of the picture images.

Returning to FIG. 1, many features (e.g., variance, bias, skewness, fitness) can be extracted from the SGLD matrix to classify the input image between picture and graphics. The features can be implemented individually or combined in various methods (e.g., linear combination). Once the SGLD matrix is built, a feature or combination of features is selected for extraction 110 and processed using feature algorithms. For example, a first feature algorithm measures variance (V) (i.e., the second-order moment around the diagonal) 112 and is defined as:

$$V=\Sigma_{|n-m|>\Delta} s(m, n) (m-n)^2/N \quad (2),$$

where s(m, n) is the (m, n)-th entry of the SGLD matrix, $\Delta$ is an integer parameter typically between 1 and 16 and;

$$N=\Sigma_{|n-m|>\Delta} s(m, n) \quad (3).$$

As the summation is over all (m, n) such that $|m-n|>\Delta$, all the pixels in the flat regions are ignored. For graphics images, the remaining pixels are on the edges, while for picture images, both pixels in the noisy regions and pixels on the edges are included. Variance (V) is typically larger for graphics images than for picture images.

The second feature algorithm measures average bias (B) 114 and is defined as:

$$B=\Sigma_{|n-m|>\Delta} s(m, n)[n-\mu(m)]^2/N \quad (4),$$

where $\mu(m)$ is the mean of s(m, n) for a fixed m. For a given m, the distribution of s(m, n) is roughly symmetrical about the diagonal for picture images, as noise typically has a zero mean symmetrical distribution. As a result B is usually small for picture images. For graphics images, s(m, n) is usually unsymmetrical and B is large.

The third feature algorithm measures skewness (S) 116 and is defined as:

$$S = \text{skewness} = \sum_{n=0}^{GL-1} \frac{\left|\sum_{m=0}^{GL-1} |n-m|(n-m)s(m,n)\right|^{\frac{1}{2}}}{\sum_{m=0}^{GL-1} |n-m|s(m,n)} c(n)/C, \quad (5)$$

where:

$$c(n) = \sum_{m=0}^{GL-1} s(m,n) \text{ and } C = \sum_{n=0}^{GL-1} c(n).. \quad (6)$$

The fourth feature algorithm measures fitness (F) 118 and is defined to be:

$$F_1 \text{fitness} = \frac{\sum_{n=0}^{GL-1}(n-m)^2 s(m,n)}{\sigma^2}, , \quad (7)$$

where σ is defined such that:

$$\sum_{d=0}^{\sigma} [s(m,m+d) + s(m,m-d)] = 0.6 \times C.. \quad (6)$$

The image type decision 120 compares the result of the feature algorithm(s) to previously selected low and high thresholds (i.e., TL and TH, respectively) depending on the algorithm(s) and combinations selected. If the result of the feature algorithm(s) is below the low threshold (TL), the image is classified as a natural picture 122. If the result exceeds the high threshold (TH), the classification is synthetic graphics 126. Obviously, if the behavior of a particular feature is converse to this logic, the decision logic can be easily reversed to accommodate. If the result of the feature algorithm(s) is equal to or between the low and high thresholds, the class of the image cannot be determined (i.e., indeterminate 124) from the feature or combination of features selected. It is understood that a number of other alternatives are possible. For example, a result equal to a particular threshold can be said to be determinative of the image class, rather than indeterminate. Also, in certain circumstances the low and high threshold can be equal.

Figure 3:
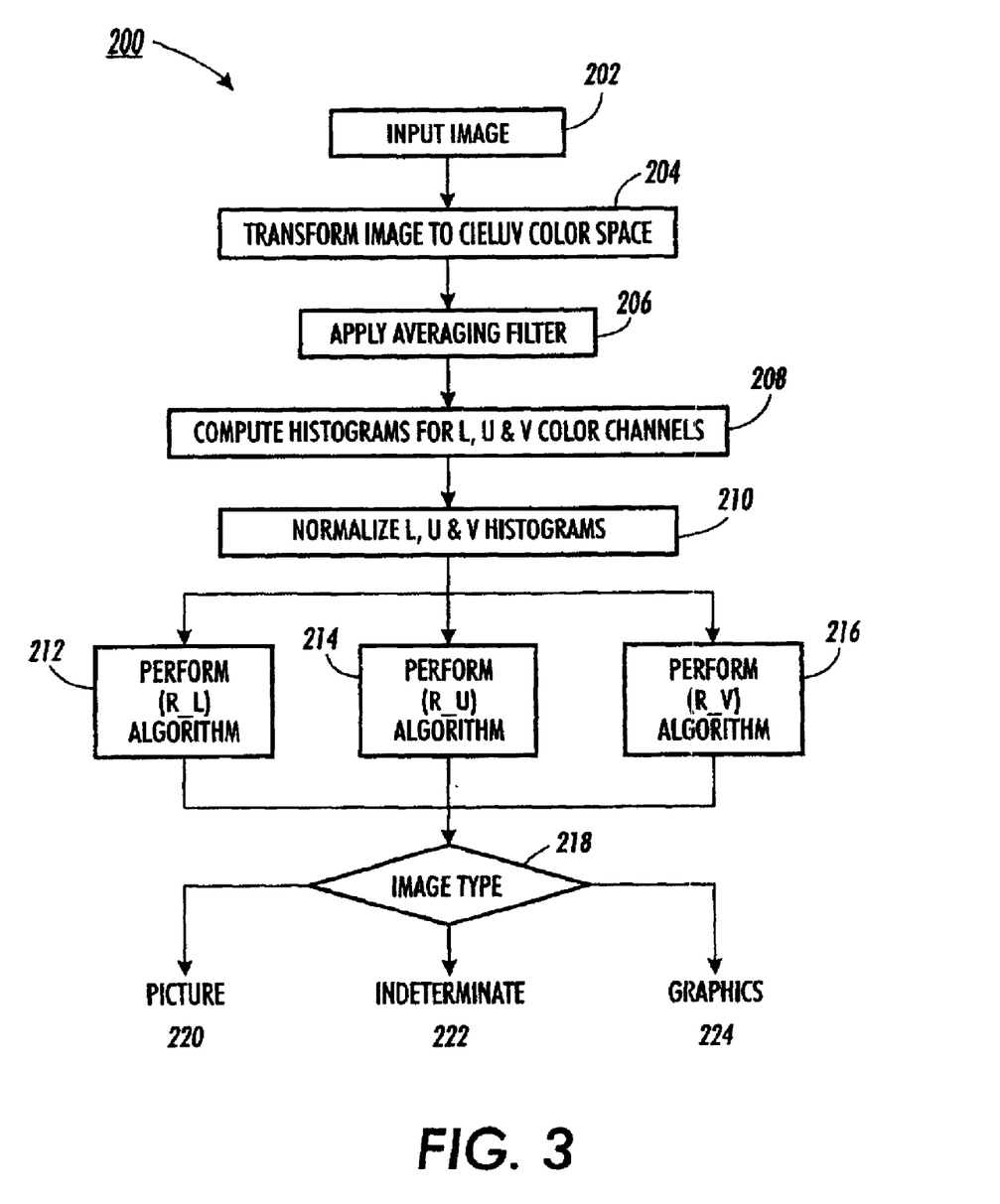
FIG. 3 is a flowchart of an image classification process using color discreteness features in accordance with an embodiment of the present invention.

With reference to FIG. 3, a flowchart of an image classification process using color discreteness features 200 in accordance with an embodiment of the present invention is shown. The process 200 begins with an input image 202. First, the input image is transformed into a color space 204, in which the classification is performed. Although CIELUV space is used as one embodiment, many other color spaces can also be used. Next, the image is smoothed using an averaging filter 206 to remove any noise due to halftones. For example, a 4×4 filter was used successfully. Color histograms are computed for each of the three (3) color channels (i.e., luminance (L), U, and V) 208. The L, U, and V histograms are normalized 210 by the number of pixels in the image. The color representation scheme is invariant under rotation and translation of the input image and the normalization provides scale invariance. If (i) is the histogram of an image, where the index i represents a histogram bin, then the normalized histogram H is defined as follows:

$$H(i) = \frac{I(i)}{\sum_{i=0}^{GL-1} I(i)}. \quad (9)$$

Since graphics are generated using a limited number of colors, graphics images usually are comprised of a few areas of uniform color. Hence, the color histograms for a graphics image usually contain several sharp peaks. On the other hand, natural pictures usually contain more colors with smoothly varying transitions. Hence, natural pictures are more noisy and produce histograms containing fewer and smoother peaks. This difference in the histograms is captured in color discreteness algorithms for each color channel (i.e., R_L algorithm 212, R_U algorithm 214, and R_V algorithm 216). The color discreteness algorithms are defined as follows:

$$R\_L = \sum_{i=1}^{GL-1} |H\_L(i+1) - H\_L(i)|, \quad (10)$$

$$R\_U = \sum_{i=1}^{GL-1} |H\_U(i+1) - H\_U(i)|, \quad (11)$$

$$R\_V = \sum_{i=1}^{GL-1} |H\_V(i+1) - H\_V(i)|, \quad (12)$$

where GL is the number of bins in the H_L, H_U, and H_V color histograms (typically, 256).

The image type decision 218 compares the results of the color discreteness algorithms to previously selected thresholds (e.g., low threshold (TL) and high threshold (TH)). If the result of any color discreteness algorithm is above TH or below TL, the image is classified as either a graphics 224 or picture 220 according to predetermined rules. Otherwise, the class of the image cannot be determined (i.e., indeterminate 222) by color discreteness features. Alternatively, the classifier may use all three (3) color discreteness features (as described above), any combination of two (2) features, or any one (1) feature. The color discreteness features can be computed faster than texture features (discussed above) or edge features (discussed below).

Figure 4:
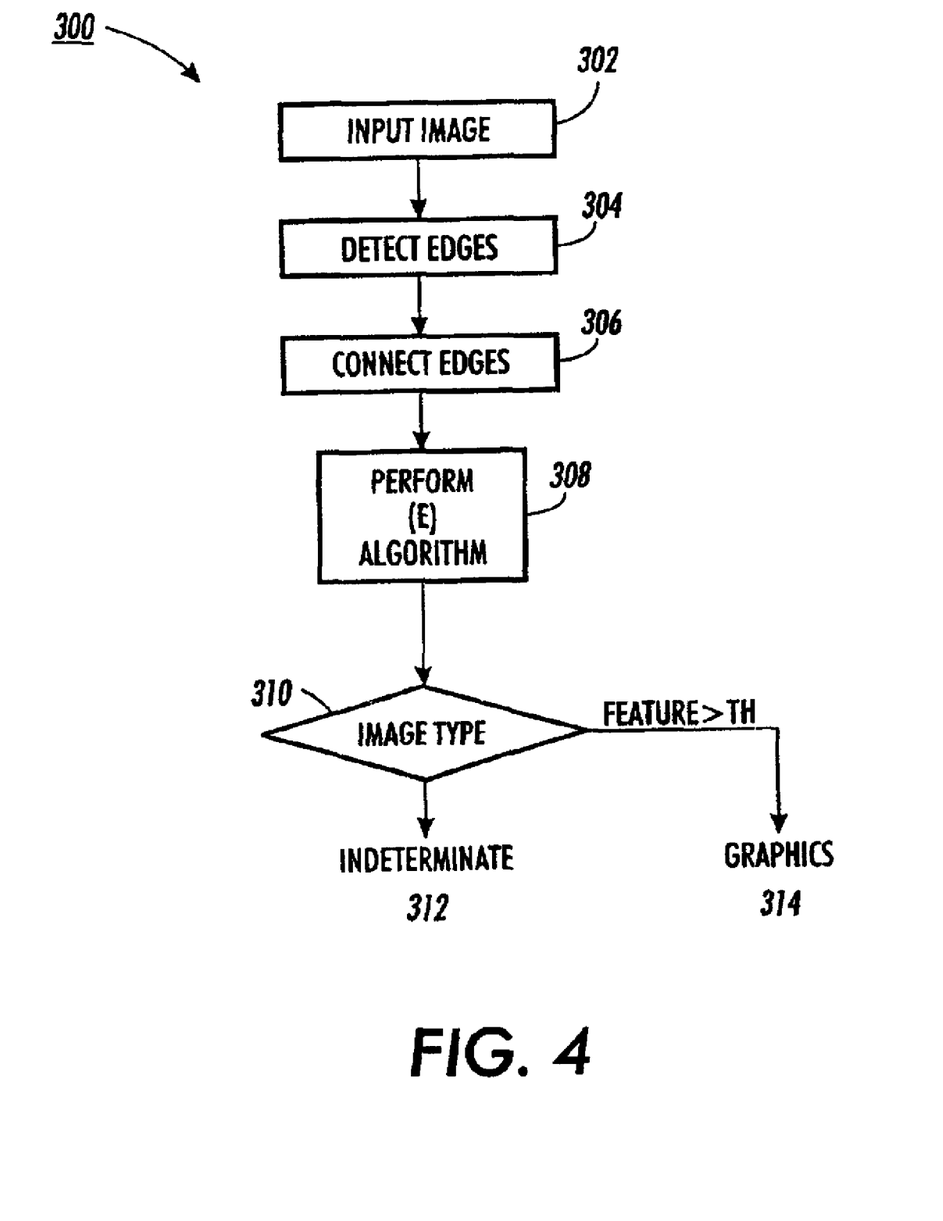
FIG. 4 is a flowchart of an image classification process using edge features in accordance with an embodiment of the present invention.

With reference to FIG. 4, a flowchart of an image classification process using edge features 300 in accordance with an embodiment of the present invention is shown. The process 300 begins with an input image 302. First, edges of color areas in the image are detected 304 using a standard Canny edge detector and an edge map image is created. The parameters identified for the edge detector were determined empirically. Deviations that produce suitable results are also contemplated. Next, the edges in the edge map image are connected 306 (e.g., using a standard 8-connected component algorithm). The average number of pixels per connected edge (E) in the edge map image is used as a feature 308. The algorithm for this edge feature is defined as:

$$E = \frac{\text{No. of Edge Pixels}}{\text{No. of Connected Edges}}. \quad (13)$$

Typically, graphics have fewer connected edges, but each connected edge consists of a large number of pixels. On the other hand, pictures have a lot more connected edges, but usually very few pixels in each connected edge. This feature is particularly accurate for high values. In other words, if the value of E is high, it is almost certain that the image is graphics. However, if the value of E is low, nothing can be said about the image. This is because the E value may be low for graphics that have low frequency halftones or certain background. Accordingly, the image type decision 310 compares the result of the feature algorithm to a previously selected high threshold (i.e., TH). If the result exceeds the high threshold (TH), the classification is synthetic graphics 314. Otherwise, the class of the image cannot be determined (i.e., indeterminate 312). It is understood that other alternatives are possible. For example, horizontal or vertical edges in the edge map may be used to classify images because the features are much more predominant in synthetic graphics than in natural pictures. Any combination of edge features or any one (1) edge feature can be used by the classifier.

Figure 5:
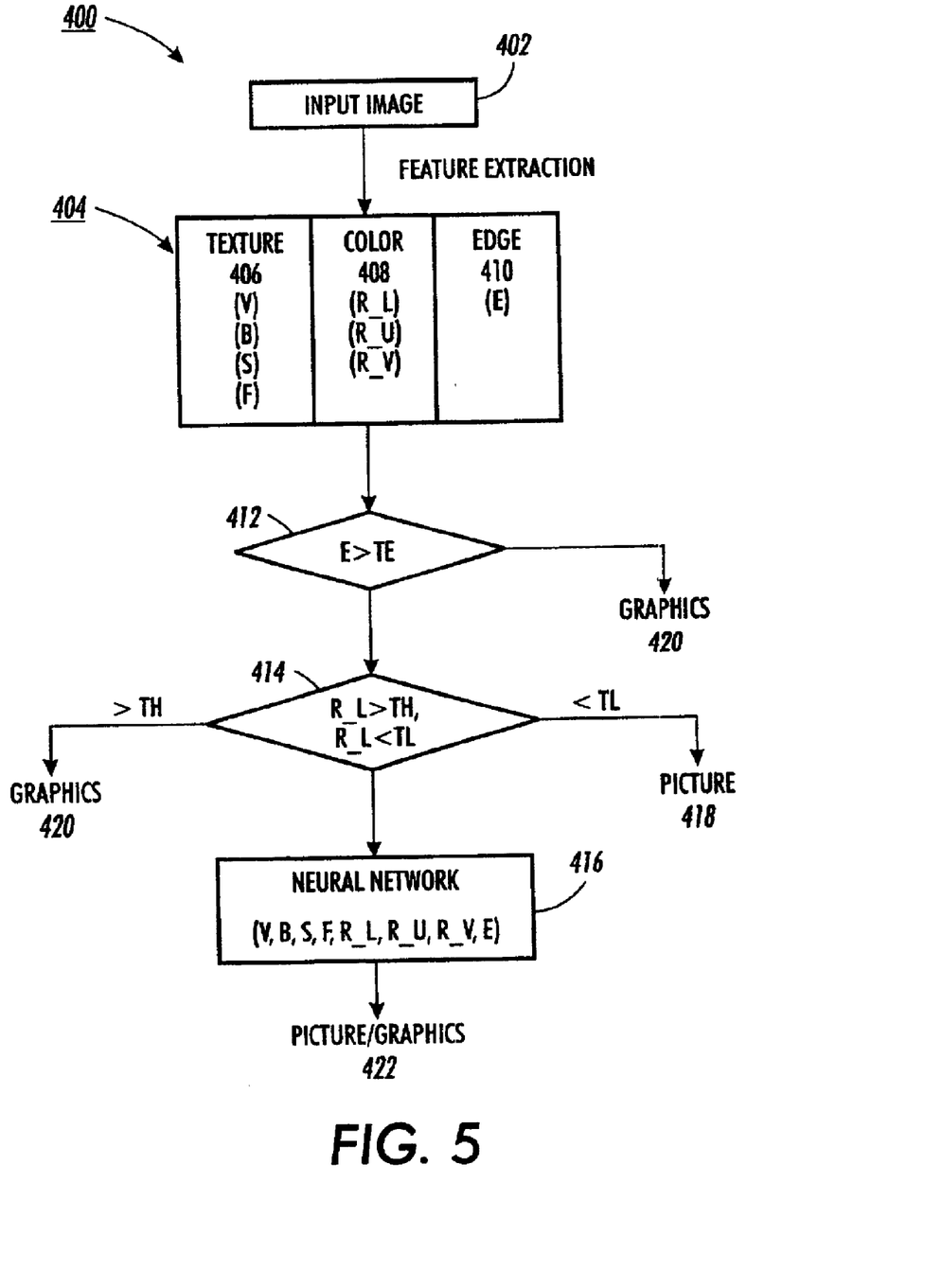
FIG. 5 is a flowchart of an image classification process using a combination of SGLD texture features, color discreteness features, and edge features in accordance with an embodiment of the present invention.

With reference to FIG. 5, a flowchart of an image classification process using a combination of SGLD texture features, color discreteness features, and edge features 400 in accordance with an embodiment of the present invention is shown. Notably, this image classifier combines all the features of the three (3) classifiers discussed above. SGLD texture, color, or edge features may be combined into one (1) classifier, whereby performance may be improved over classifiers using a single feature.

While developing a classifier based on a combination of texture, color, and edge features, it was observed that the classification and regression tree (CART) method, a public domain tree classifier, gave significant importance to the first color discreteness feature (R_L). It was also observed that the edge feature (E) was only accurate at large values (i.e., if the feature value was large) in determining that the image was a graphics. However, when the edge feature value was small, it was unable to determine whether the image was a picture or a graphics. All these observations can be combined in a rule-based tree classifier that uses a neural network at one (1) of its nodes. The combination of classifiers can analyze texture, color, and edge features to distinguish between picture and graphics images.

The process 400 begins with an input image 102. Next, the features are extracted from the input image 404. Feature extraction includes compiling SGLD texture features 406 (e.g., variance (V), bias (B), skewness (S), fitness (F)), color discreteness features 408 (e.g., R_L, R_U, R_V), and edge features 410 (e.g., pixels per connected edge (E), horizontal edges, vertical edges). Alternatively, any combination of two (2) or more features that lead to the desired classification are contemplated, including the use of additional features. The SGLD texture features are compiled by performing steps 104–118 of the process depicted in FIG. 1. Similarly, the color discreteness features are compiled by performing steps 204–216 of the process depicted in FIG. 3. Likewise, the edge features are compiled by performing steps 304–310 of FIG. 4.

While developing the classifier, it was observed that the edge feature (E) was accurate at large values (i.e., when E is large, it is almost certain that the image is graphics). This observation was incorporated as a rule in the classifier. Hence, a first rule-based decision (i.e., E>TE 412) classifies the image as graphics 420, if:

$$E > TE \quad (14),$$

where TE is a previously identified high threshold value for the edge feature. Experimentally, TE=120 produced satisfactory results.

It was also observed that the public domain tree classifier CART gave significant importance to the first color discreteness feature (R_L). This observation was also incorporated as a rule in the classifier. Hence, a second rule-based decision (i.e., R_L>TH, R_L<TL 414) classifies the image as a graphics, if:

$$R\_L > TH \quad (15),$$

and as picture, if:

$$R\_L < TL \quad (16),$$

where TH and TL are high and low threshold values, respectively, for the R_L color discreteness feature. Experimentally, TH=0.15 and TL=0.05 produced satisfactory results.

If the class of the image cannot be determined from the rules the neural network 416 operates using any combination of two or more of the texture, color, and edge features to make the determination. The features are scaled to [0, 1] before feeding into the neural network. One embodiment of the neural network is a standard feedforward architecture. A back-propagation algorithm is implemented for training the network. The feedforward architecture includes an input layer, a hidden layer, and an output layer. The input layer includes a plurality of source nodes (e.g., eight (8)). The hidden layer and the output layer are each comprised of one (1) neuron (i.e., computation nodes). The source nodes are projected onto the computation nodes, but not vice versa—hence the "feed forward" name. The hidden neuron intervenes between the external input and output layers and enables the network to extract higher-order statistics.

The back-propagation algorithm, also known as the error back-propagation algorithm, trains the neural network in a supervised manner. Basically, back-propagation learning consists of two (2) passes through the different layers of the network: a forward pass and a backward pass. In the forward pass, an input pattern is applied to the source nodes and its effect propagates through the network. The output produced represents the actual response of the network. During the forward pass the synaptic weights of the network are all fixed. During the backward pass, on the other hand, the synaptic weights are all adjusted in accordance with an error-correction rule. Specifically, the actual response of the network is subtracted from a desired (target) response to produce an error signal. This error signal is then propagated backward through the network, against the direction of synaptic connections—hence the name "error back-propagation." The synaptic weights are adjusted to make the actual response of the network move closer to the desired response in a statistical sense.

As shown in FIG. 5, the neural network has eight (8) inputs 404 (i.e., V, B, S, F, R_L, R_U, R_V, E) and one (1) binary output (i.e., picture/graphics 422). The rule-based portion of the classifier (i.e., 412, 414) does not need any training. The neural network 416 was trained with samples that were already classified correctly by the rule-based classifier portion and tested on the rest of the samples.

Figure 6:
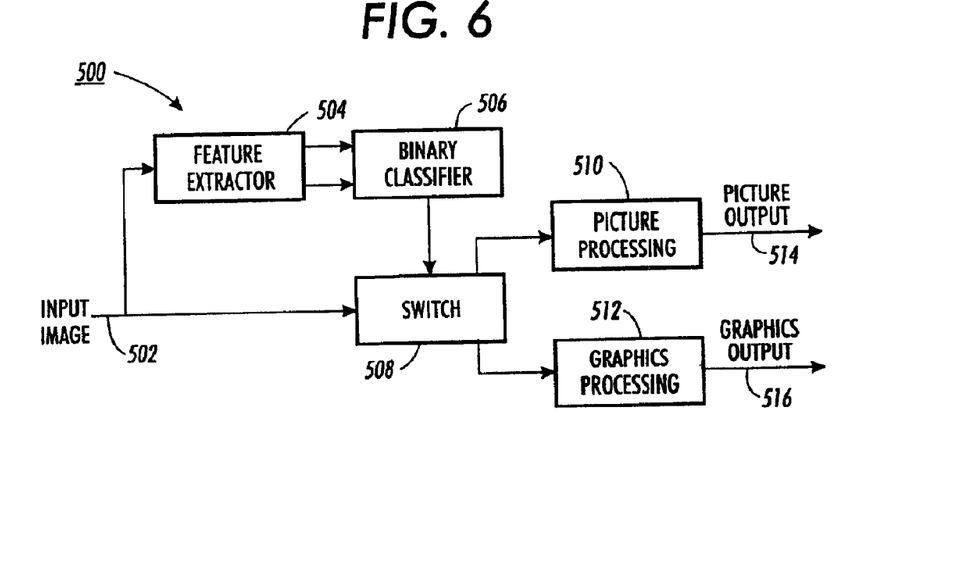
FIG. 6 is a block diagram of an image processing system using a "binary" image classification process (i.e., classification of images between picture or graphics classes)

With reference to FIG. 6, a block diagram of an image segmentation system 500 using a "binary" image classification process (i.e., classification of images between picture or graphics classes) is shown. The picture/graphics classifiers (i.e., 100, 200, 300, 400) of FIGS. 1–4 are "binary" classifiers and could be implemented in such a system 500. As described above for FIGS. 1–4, an input image 502 is provided to a feature extractor 504. The feature extractor 504 extracts pertinent characteristics (i.e., features) based on the parameters required by algorithms of the binary classifier 506. The binary classifier 506 exercises algorithms designed to classify the input image between a natural picture or a synthetic graphics image (e.g., [0, 1] where 0 indicates picture and 1 indicates graphics). This binary classification result is provided to a switch 508. The switch 508 receives the input image 502 and switches it between picture processing 510 and graphics processing 512, depending on the binary classification result. Picture processing 510 processes the image in a manner tailored to maximize the quality of natural picture images (e.g., gamut mapping). Similarly, graphics processing 512 is tailored to maximizes the quality of synthetic graphics images (e.g., filtering). If the input image is classified as a picture, the input image 502 is switched to picture processing 510 and a picture output 514 is produced. Alternatively, if the image is classified as graphics, the input image 502 is switched to graphics processing 512 and a graphics output 516 is produced. In the event that the binary classifier 506 cannot determine the class of the input image, one (1) of the processes (e.g., picture processing 510) may be selected by default.

Figure 7:
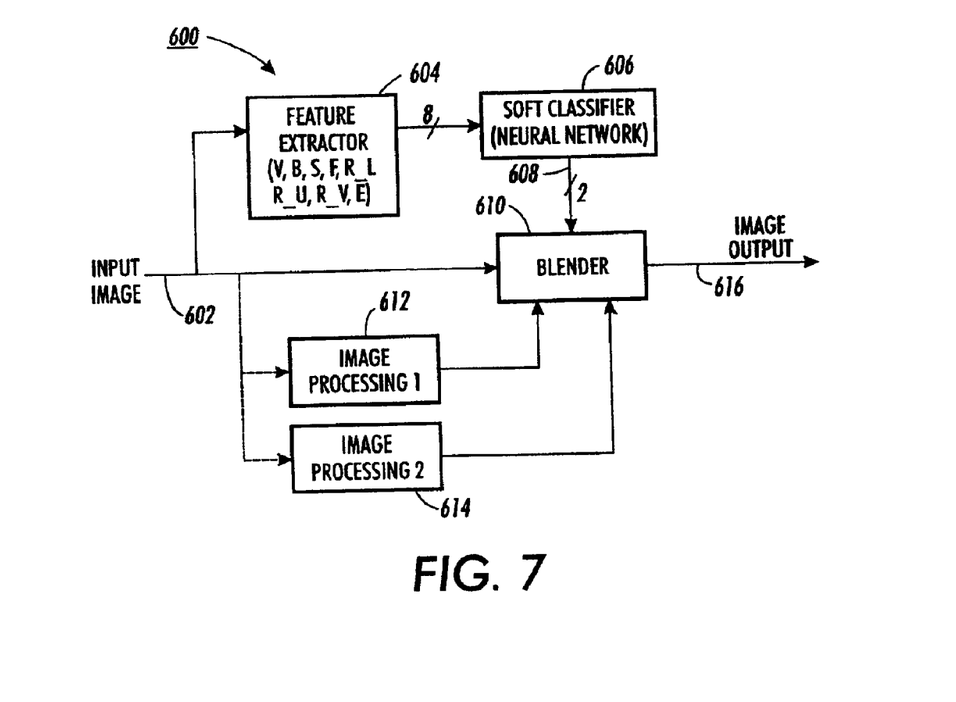
FIG. 7 is a block diagram of an image processing system using a "soft" image classification process (i.e., classification of image areas between picture, graphics, or fuzzy classes) and an associated process for blending image processing functions based on the classification.

With reference to FIG. 7, a block diagram of an image processing system using a "soft" image classification process (i.e., classification of image areas between picture, graphics, or fuzzy classes) and an associated process for blending image processing functions based on the classification is shown.

The "soft" fuzzy image classification is an improvement over the fuzzy classification process (e.g., as disclosed in U.S. Pat. No. 5,778,156 to Schweid) by making the classification decision "soft." This is done by using a neural network, with image features as inputs and "two" outputs. The soft classification result is then used to "blend" the down stream image processing functions (i.e., gamut mapping or filtering). It can also be used to evaluate the confidence level of the classification, and take appropriate actions. Again, as described above for FIGS. 1–4, an image input 602 is provided to a feature extractor 604. The feature extractor 604 extracts two (2) or more pertinent characteristics (i.e., features) from the input image 602 and provides it to a soft classifier 606 (e.g., neural network, fuzzy decision tree, Gaussian maximum likelihood, or any classifier with continuous, rather than binary output). As discussed above for binary classifiers, the features provided to the classifier can be indicative of various distinguishing characteristics of an input image. For example, two (2) or more texture (e.g., V, B, S, F), color discreteness (e.g., R_L, R_U, R_V), or edge (e.g., E) features can be implemented in any combination. Additional features that lead to the desired classification are also contemplated.

In one embodiment, the soft classifier 606 is a neural network in a standard feedforward architecture, similar to the neural network described above in reference to FIG. 5. However, in the neural network of the "soft" classifier, the hidden layer includes one (1) or two (2) neurons and the output layer is comprised of two (2) neurons. Like the neural network above, a back-propagation algorithm is implemented for training the network. Each of the two (2) outputs (i.e., a, b) of the neural network will have a value that ranges between a minimum and a maximum (e.g., between 0 and 1). The output value represents the level of membership for an area of the input image in each of two (2) classes (e.g., picture, graphics). Ideally, when an area is in the graphics class, the output will be [1, 0]. Conversely, if the area is in the picture class, the output will be [0, 1]. In actual cases using these rules, both outputs (e.g., [a, b]) will usually range between 0 and 1, indicating that the area of the input image is in the fuzzy class and further indicating the level of membership to both picture and graphics classes. The "soft" classification result 608 (i.e., an input image with picture, graphics, and/or fuzzy areas) is used to "blend" 610 the down stream image processing functions (e.g., image processing 1 (612), image processing 2 (614)), creating a "blended" image processing function, to produce an output image 616. In the preferred embodiment, image processing 1 is a gamut mapping/filtering process for pictures and image processing 2 is a gamut mapping/filtering process for graphics. However, alternative configurations are envisioned with additional image processing functions or different functions.

In another embodiment, the input image 602 is provided to each of a plurality of image processing functions (e.g., image processing 1 (612) and image processing 2 (614)), rather than to the "blender." This is shown in FIG. 7 via dashed lines. In this alternative, the "soft" classification result 608 (i.e., an input image with picture, graphics, and/or fuzzy areas) is used to "blend" 610 the processed images resulting from the multiple image processing functions to produce a "blended" output image 616.

Alternatively, if a binary decision is desired, a and b are compared to make the classification decision. The difference between a and b provides the classification based on the following rules:

$$a-b \gg 0, \text{ graphics class} \qquad (17);$$

$$a-b \approx 0, \text{ indeterminate} \qquad (18); \text{ and}$$

$$a-b \ll 0, \text{ picture class} \qquad (19).$$

The difference between a and b can also be used as a confidence level of the classification based on the following rules:

$$a-b \gg 0, \text{ strong confidence of graphics class, little confidence of picture class;} \qquad (20);$$

$$a-b \approx 0, \text{ uncertainty in classification;} \qquad (21); \text{ and}$$

$$a-b \ll 0, \text{ strong likelihood of picture class, little confidence of graphics class} \qquad (22).$$

In some spatial gamut mapping techniques, a spatial feedback filter is used to preserve luminance variations in the gamut mapping process. The optimal footprint and coefficients of the filter depend heavily on the nature of the image content (i.e., natural picture versus synthetic graphics). Where this technique is implemented by blending 601, the output of the soft classifier 608 can be used to steer the filter parameters. Similarly, methods of blending filter coefficients have been described in U.S. Pat. No. 5,778,156 to Schweid et al. entitled "Method and System for Implementing Fuzzy Image Processing of Image Data."

Even if downstream image processing functions (e.g., gamut mapping or filtering) are not blended 610, the "soft" classification result 608 can be used to bias the classification decision to be on the safe side or to select a safe or neutral position when the confidence level is low.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for classification of areas of an input image in picture, graphics, or fuzzy classes, comprising the following steps:

a) extracting a plurality of features from an input image;
   b) processing two or more extracted features using a soft classifier to classify areas of the input image in either picture, graphics, or fuzzy classes; and
   c) blending a plurality of image processing functions based on the classification of areas of the input image in picture, graphics, or fuzzy classes to produce an output image associated with the input image.

2. The method as set forth in claim 1, wherein the plurality of features extracted in step a) include one or more spatial gray-level dependence texture features.

3. The method as set forth in claim 2, wherein the spatial gray-level dependence texture features are based on features extracted from a spatial gray-level dependence matrix representing the input image and wherein said features include one or more of a set comprising a variance feature, a bias feature, a skewness feature, and a fitness feature.

4. The method as set forth in claim 1, wherein the plurality of features extracted in step a) include one or more color discreteness features.

5. The method as set forth in claim 4, wherein the color discreteness features are based on features extracted from color histograms computed from a representation of the input image in a color space and wherein said features include one or more of a set of multiple normalized histograms.

6. The method as set forth in claim 4, wherein the color discreteness features are based on features extracted from color histograms computed from a representation of the input image in CIELUV color space and wherein said features include one or more of a set comprising a normalized histogram for the luminance color channel ($R\_L$), a normalized histogram for the U color channel ($R\_U$), and a normalized histogram for the V color channel ($R\_V$).

7. The method as set forth in claim 1, wherein the plurality of features extracted in step a) include one or more edge features.

8. The method as set forth in claim 7, wherein the edge features are based on features extracted from an edge map image representing the input image and wherein said features include one or more of a set of features comprising an average number of pixels per connected edge, a quantity of horizontal edges, and a quantity of vertical edges.

9. The method as set forth in claim 1, wherein the soft classifier of step b) is a neural network constructed in a feedforward architecture comprising an input layer, at least one hidden layer, and an output layer and includes a back-propagation algorithm.

10. The method as set forth in claim 9, wherein the input layer of the neural network is comprised of two or more source nodes corresponding to the two or more extracted features.

11. The method as set forth in claim 9, wherein the hidden layer of the neural network is comprised of at least one neuron.

12. The method as set forth in claim 9, wherein the output layer of the neural network is comprised of a first neuron and a second neuron for indicating the result of processing by the neural network and the corresponding classification of the input image between picture, graphics, or fuzzy classes.

13. The method as set forth in claim 12, wherein the first and second neurons each range between a minimum and maximum value based on the processing of extracted features by the neural network for an area of the input image, wherein the value of the first neuron indicates a level of membership of said area to the graphics class, the maximum value indicating the strongest level of membership, and wherein the value of the second neuron indicates a level of membership of said area to the picture class, the maximum value indicating the strongest level of membership.

14. The method as set forth in claim 13, wherein the value of the first neuron and the value of the second neuron are used to classify the area of the input image in either picture, graphics, or fuzzy classes in accordance with the following rules:

if the first neuron is at its maximum value and the second neuron is at its minimum value, said area is classified in the graphics class;
   if the first neuron is at its minimum value and the second neuron is at its maximum value, said area is classified in the picture class;
   otherwise, said area is classified in the fuzzy class.

15. The method as set forth in claim 13, wherein the difference between the value of the first neuron and the value of the second neuron is used to classify the area of the input image in either picture or graphics classes in accordance with the following rules:

if the difference is much greater than zero, said area is classified in the graphics class;
   if the difference is much less than zero, said area is classified in the picture class; and
   if the difference is approximately zero, the result is indeterminate.

16. The method as set forth in claim 15, wherein the difference between the value of the first neuron and the value of the second neuron is used to determine the confidence level of any classification in accordance with the following rules:

if the difference is much greater than zero and the classification is graphics, there is strong confidence in said classification;
   if the difference is much less than zero and the classification is picture, there is strong confidence in said classification; and
   if the difference is approximately zero, there is limited confidence in the classification.

17. A method for classification of areas of an input image in picture, graphics, or fuzzy classes, comprising the following steps:

a) extracting a plurality of features from an input image;
   b) processing two or more extracted features using a soft classifier to classify areas of the input image in either picture, graphics, or fuzzy classes; and
   c) blending a plurality of processed images based on the classification of areas of the input image in picture, graphics, or fuzzy classes to produce an output image associated with the input image.

18. An image processing system for producing an output image associated with an input image based on classification of areas of the input image, comprising:

a feature extractor for extracting a plurality of features from the input image;
   a soft classifier for classifying areas of the input image in picture, graphics, or fuzzy classes using a combination of any two or more of the extracted features;
   a plurality of image processing modules for providing a plurality of image processing functions; and a blender for blending the image processing functions, said blending based on the classification of areas of the input image by the soft classifier.

19. The image processing system as set forth in claim 18, wherein the feature extractor extracts a plurality of spatial gray-level dependence texture features, color discreteness features, and/or edge features and the soft classifier uses any combination of two or more of said features to classify areas of the input image.

20. The image processing system as set forth in claim 18, wherein the soft classifier is a neural network.

21. The image processing system as set forth in claim 18, wherein the blender blends the image processing functions of the plurality of image processing modules, thereby providing a blended image process.

22. The image processing system as set forth in claim 18, wherein the blender blends processed images from the plurality of image processing modules, thereby providing a blended output image.

23. A method for evaluating the confidence level of the classification of an image, comprising the following steps:
   a) extracting a plurality of features from an input image;
   b) processing two or more extracted features using a soft classifier to determine a first output and a second output indicative of a combined confidence level for classification of an area of the input image in either picture, graphics, or fuzzy classes, wherein the first output indicates a first confidence level for classification of the area in the picture class and the second output indicates a second confidence level for classification of the area in the graphics class; and
   c) classifying the area of the input image in either picture, graphics, or fuzzy classes based at least in cart on the combined confidence level.

24. The method as set forth in claim 17, wherein the plurality of features extracted in step a) include at least one spatial gray-level dependence texture feature.

25. The method as set forth in claim 17, wherein the plurality of features extracted in step a) include at least one color discreteness feature.

26. The method as set forth in claim 17, wherein the plurality of features extracted in step a) include at least one edge feature.

27. The method as set forth in claim 17, wherein the soft classifier of step b) is a neural network.

* * * * *